US 6,659,044 B2

(12) United States Patent
Salinas

(10) Patent No.: US 6,659,044 B2
(45) Date of Patent: Dec. 9, 2003

(54) WATER CIRCULATION APPARATUS AND METHOD

(75) Inventor: Daniel Eduardo Vega Salinas, Puerto Montt (CL)

(73) Assignee: Tech Master S.A., Puerto Montt (CL)

( * ) Notice: Subject to any disclaimer, the term of this patent is extended or adjusted under 35 U.S.C. 154(b) by 0 days.

(21) Appl. No.: 09/899,756

(22) Filed: Jul. 5, 2001

(65) Prior Publication Data

US 2002/0069833 A1 Jun. 13, 2002

(30) Foreign Application Priority Data

Jul. 5, 2000 (CL) .......................................... 1800-2000

(51) Int. Cl.$^7$ ............................................. A01K 61/00
(52) U.S. Cl. ...................................................... 119/232
(58) Field of Search ................................ 119/215, 223, 119/226, 232, 263, 264, 342; 366/262, 263, 264, 343; 210/194

(56) References Cited

U.S. PATENT DOCUMENTS

| | | | |
|---|---|---|---|
| 2,827,268 A | | 3/1958 | Staaf |
| 3,780,998 A | * | 12/1973 | Botsch ........................ 261/91 |
| 3,856,272 A | * | 12/1974 | Ravitts ..................... 210/242.2 |
| 4,044,720 A | | 8/1977 | Fast |
| 4,051,810 A | * | 10/1977 | Breit ......................... 119/51.04 |
| 4,250,835 A | * | 2/1981 | Dugan et al. ................ 119/212 |
| 4,308,137 A | * | 12/1981 | Freeman ..................... 210/194 |
| 4,981,366 A | * | 1/1991 | Wickoren .................... 210/197 |
| 5,106,230 A | * | 4/1992 | Finley .......................... 119/200 |
| 5,876,639 A | * | 3/1999 | Campau ....................... 119/263 |
| 5,942,116 A | * | 8/1999 | Clark et al. .................. 210/194 |
| 6,050,550 A | * | 4/2000 | Burgess ....................... 119/215 |
| 6,254,769 B1 | * | 7/2001 | Whittaker .................... 119/226 |

FOREIGN PATENT DOCUMENTS

| | | |
|---|---|---|
| FR | 2165058 | 8/1973 |
| NO | 832490 | 7/1983 |
| WO | WO96/13973 | 5/1996 |

OTHER PUBLICATIONS

Rubb (Norwegian Catalog), four pages, published Aug. 1989.

* cited by examiner

*Primary Examiner*—Thomas Price
(74) *Attorney, Agent, or Firm*—Michael Best & Friedrich LLP

(57) ABSTRACT

An apparatus and method for conditioning water in open fish breeding cages, which can solve the problems of "bloom of harmful seaweed" and the "lack of dissolved oxygen concentration in the water". The apparatus includes a tube having adjustable open upper and lower ends and an impeller for drawing a major water flow in either direction through the tube. To solve the "bloom of harmful seaweed" the apparatus draws water upward from deeper water with low algae concentration to the bloom zone, dissolving and moving the harmful seaweed far away from the cages. To solve the "lack of dissolved oxygen concentration" the apparatus draws water downward from the surface water having high concentrations of dissolved oxygen to deeper water with low concentrations of dissolved oxygen, increasing the dissolved oxygen concentration in the middle and the bottom of the cages, where the biggest oxygen consuming fish concentration are located.

5 Claims, 5 Drawing Sheets

WATER CIRCULATION APPARATUS AND METHOD

FIELD OF THE INVENTION

The breeding of captive fish is mainly performed pursuant to two systems: closed tanks or cages and cages that are open on the sides and on the bottom in order to allow water to pass through the cage.

BACKGROUND OF THE INVENTION

The first system is more expensive and permits full control of the water inside the cage, including its temperature, cleanliness, nutritional content, oxygen content and other factors. Its contact with the surrounding aquatic medium—seas or lakes—is made through pipes or tubes whose flow can be regulated in order to maintain all the system variables at their optimum values. For this reason, if due care is taken to inject algae-free water into the system, algae problems are eliminated. The scarcity of oxygen in the cage is overcome by introducing water containing dissolved oxygen into the cage. The elevated temperature within the cage is solved by injecting a controlled quantity of cold water from the surrounding sea or lake bottom to replace an equal quantity of warmer water inside the cage.

In the case of the opened cages, many systems are available to reduce the seaweed bloom and attack the reductions of oxygen and other complications associated with the seaweed bloom. One system covers the cage with a plastic mesh to prevent seaweed from entering the cage. This system is used in combination with a compressor that injects and distributes air into the cage to compensate for the reduction of oxygen in the cage. This system is disadvantageous because it is expensive and causes the fish to be stressed. Another system dismantles and drags the cages to sea zones where seaweed bloom is not present. This system is expensive and produces a high mortality rate in the fish due to the stress involve with moving the cages. An alternative system uses outboard engines to create sea flows in the direction of the seaweed to maintain the seaweed away from the cages. This is only a partial solution and is limited to the direction in which the engine is operating. Another possible system avoids the seaweed by submersing the cages below the surface of the water. This system makes it difficult for the fish in the cages to obtain sufficient food and oxygen.

The reduction of oxygen that is present in the open cages is corrected by the use of air injection. One system injects air through compressors that produce micro-bubbles by means of a ceramic element or the like. This system is expensive and creates bubbles that cause stress to the fish. Another system injects air through porous hoses that distribute oxygen in the seawater. This system is not efficient because it fails to transfer an appropriate amount of oxygen to the sea.

It is known in the art to use different devices for controlling the temperature of water in open fish breeding cages by drawing medium flows of water from deeper cooler or warmer zones to the cages. Because these kinds of devices are directed to the temperature, they are not able to solve the "bloom of harmful seaweed" problem or the "lack of dissolved oxygen" problem.

SUMMARY OF THE INVENTION

In the breeding of fish in captivity, in cages located in the sea and lakes, a number of troubles are found in surrounding zones in which are involved biological, physical and chemical factors of the water and oceanographic. The most relevant problems for this business activity are the "Bloom of harmful seaweed" and the "lack of dissolved oxygen concentration in the water sea". The bloom of seaweed is a flowering or explosive increase of microscopic seaweed. The seaweed is highly concentrated in the first six meters of depth and is transported by the sea flow. The seaweed enters into the cages of fish and provokes high rates of fish mortality by entering in their bronchia and preventing them from breathing, resulting in asphyxia. The cause of the bloom of seaweed has a natural, biological, physical and chemical origin, and is determined by oceanographic and weather conditions. The oxygen drops are decreases of the water oxygen concentrations below the minimum levels for fish survival. Lack of oxygen increases with the depth of the water and causes the fish to die from asphyxia. This water phenomenon is the consequence of alterations in the factors involved in water oxygen concentrations due to the change in weather and ocean conditions.

The system of the present invention extracts deep waters, with low concentrations of seaweed to a major flow, carrys it to the surface and produces a water flow dissolving the seaweed concentrations and carrying them far away from the cages on an expansive wave. Likewise, the system injects the surface water, with better oxygen concentrations, towards deep waters which contain fish life but lack of dissolved oxygen concentrations.

Other features and advantages of the invention will become apparent to those skilled in the art upon review of the following detailed description, claims, and drawings.

Figure 1:
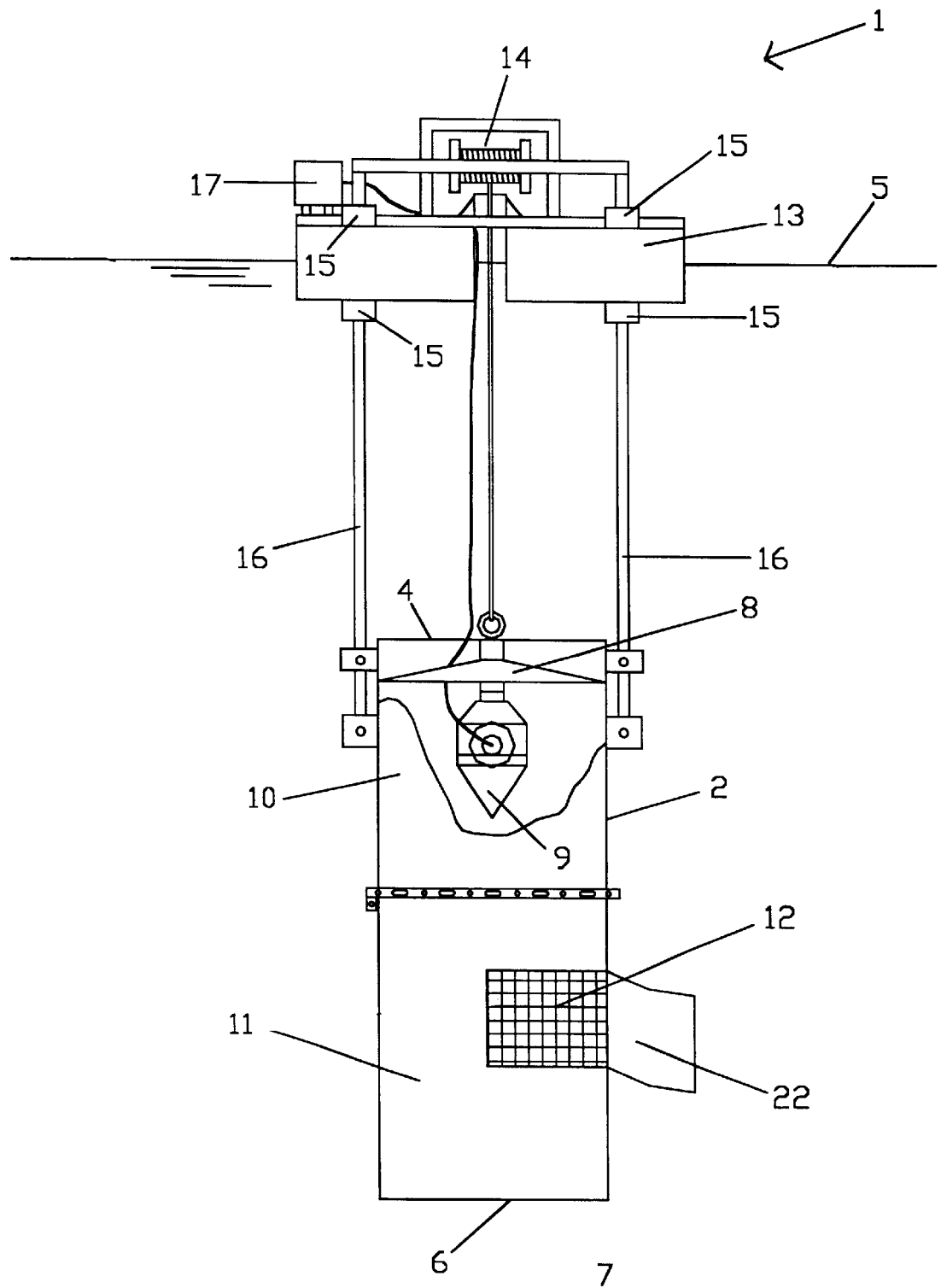
FIG. 1 illustrates a water circulation apparatus of the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and it is not meant to indicate that the elements should be performed in a particular order.

DETAILED DESCRIPTION

In order to solve the problems described above, a mechanical water circulation apparatus 1, as illustrated in FIG. 1, has been developed that includes a vertically immersed tube 2. The water circulation apparatus 1 are positioned immediately outside a set of fish cages 3 and between them at approximately the center of the set of cages 3. The tube 2 includes an upper end, where an upper mouth 4 is located, the upper mouth 4 positioned near the surface of the water 5 and a lower end, where a lower mouth 6 is located, the lower mouth 6 positioned in the deeper zones of the water 7 which are free of algae.

The tube 2 includes a vertical axis rotary impeller 8 with its driver motor 9, which is centered inside of the tube 2 parallel to the axis of the tube 2. The rotary impeller 8 drives water in the tube 2 upward or downward as required. The tube 2 comprises a first section 10 which contains inside the impeller 8 with its driver motor 9 and a second section 11, connected to the lower part of said first section 10, which comprises an adjustable length metallic mesh tube 12. A plastic sleeve 22 is coupled to the mesh tube 12 in order to adjust the depth of the suction or discharge point of the apparatus 1.

The water circulation apparatus 1 includes a floating platform 13 that supports the weight of the tube 2 and the impeller 8, which hang from the floating platform 13 into the water. The floating platform 13 includes an adjustment mechanism 14 that positions the tube 2 at a required depth. The floating platform 13 also includes bushings 15 that are coupled to the floating platform 13, and bars 16 that are inserted into the bushings 15 and coupled to the tube 2 such that the bars 16 are slidably coupled to the floating platform 13.

The water circulation apparatus 1 also includes power generators 17 that drives the impeller driver motor 9. The power generators 17 may consist of different types of motors, for example, electrical, hydraulic, fuel and other types. In a preferred embodiment, this apparatus 1 produces the best results when using a hydraulic motor to drive the impeller 8. The hydraulic motor is supplied with compressed oil through a pump 23 that is located on the floating platform 13.

Figure 2:
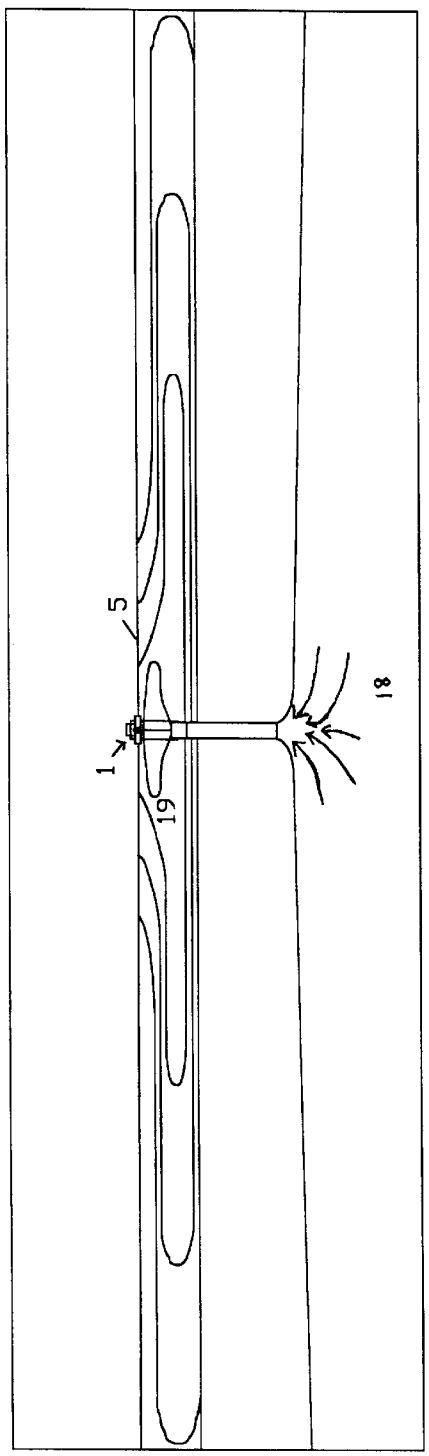
FIG. 2 illustrates the water current generated when the apparatus is drawing an upward major flow, in order to solve the "bloom of harmful seaweed" problem.
Figure 4:
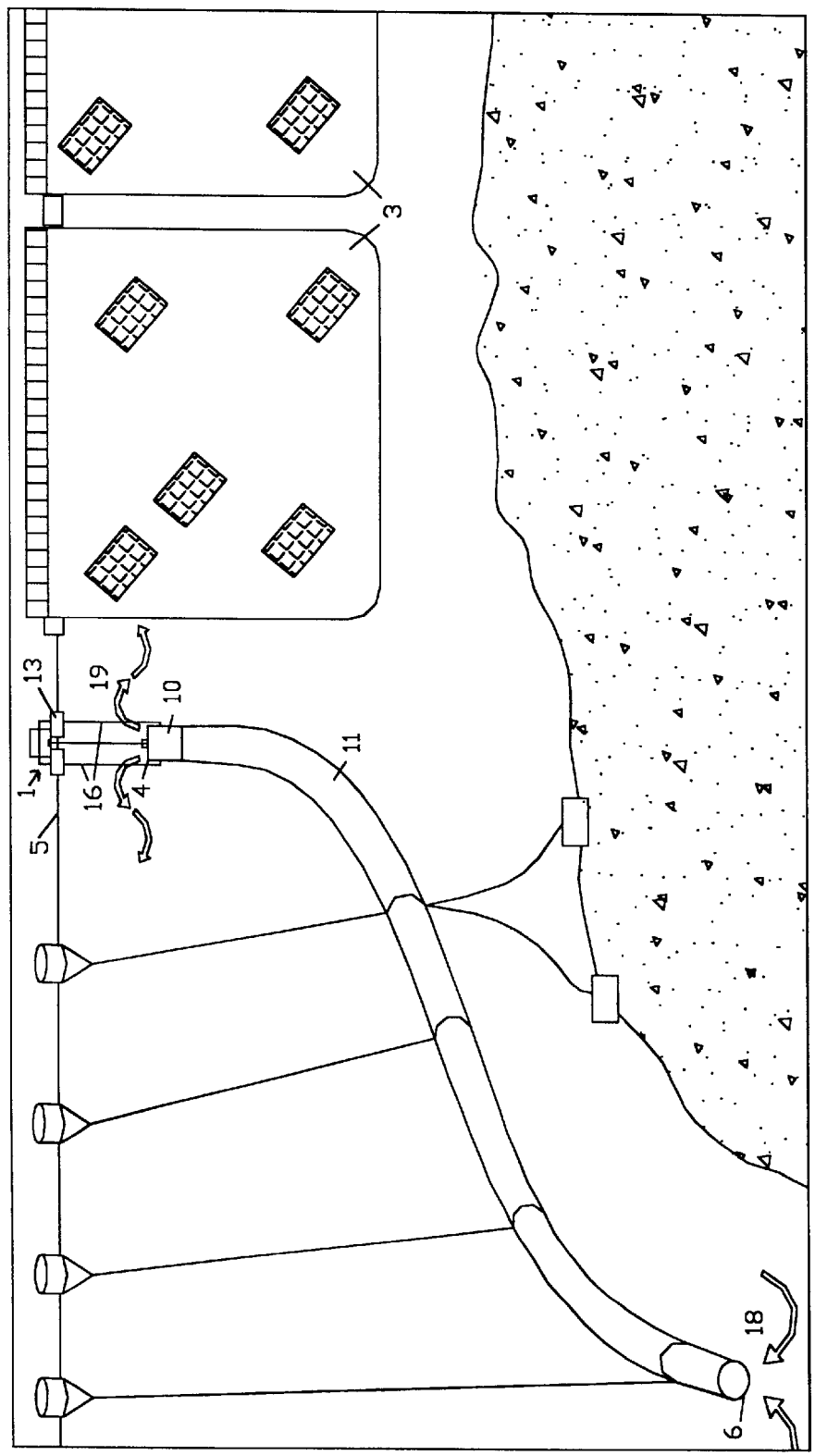
FIG. 4 illustrates the location of the apparatus with respect to a set of open fish breeding cages when the apparatus is drawing an upward major flow, in order to solve the "bloom of harmful seaweed" problem.
Figure 6:
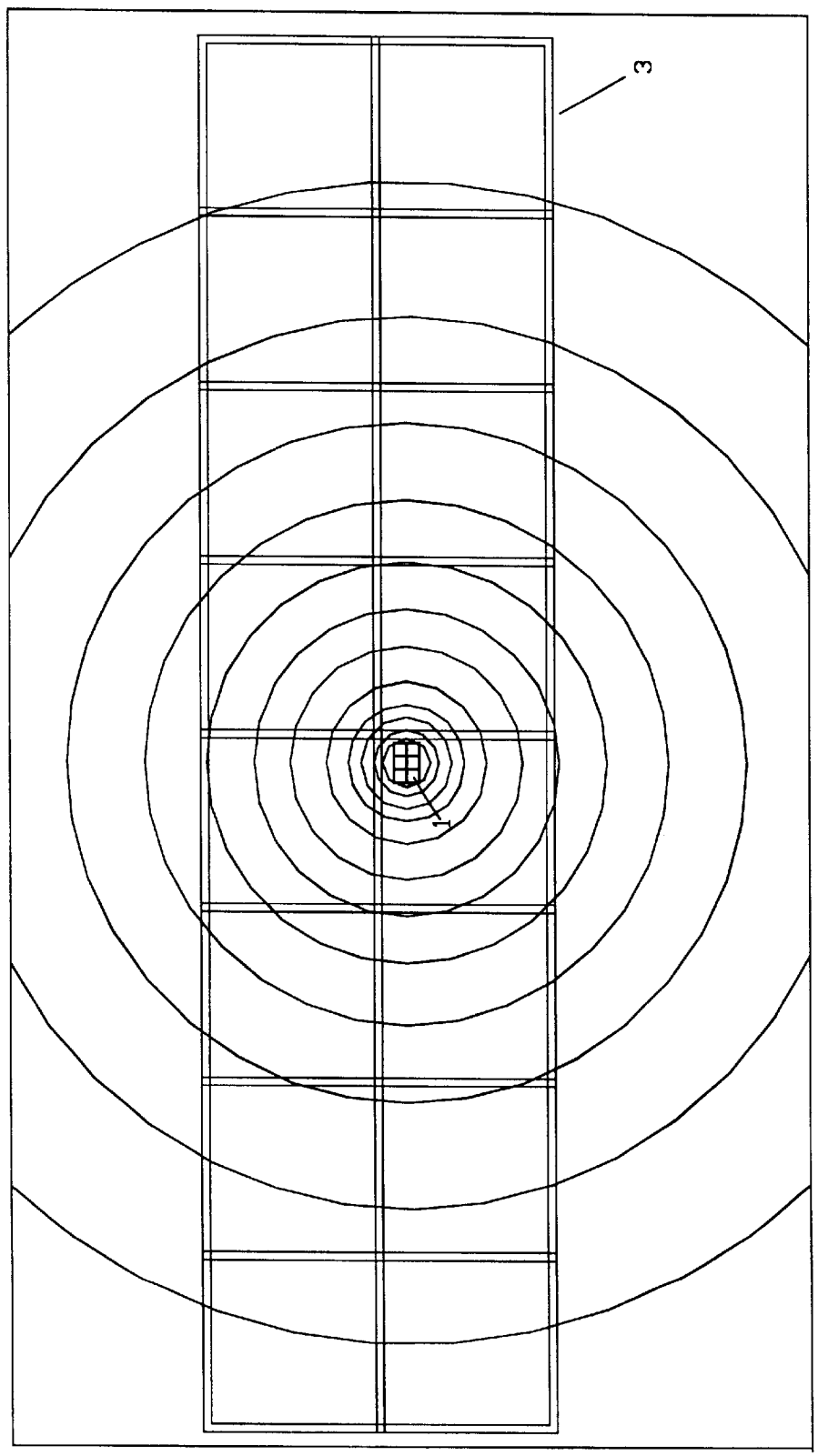
FIG. 6 illustrates uninterrupted outward currents generated for the apparatus in all radial directions, that dilutes and carries away the "bloom of harmful seaweed" when the apparatus is drawing an upward major flow, in order to solve the "bloom of harmful seaweed" problem.

Referring now to FIGS. 1, 2 and 4, when it is necessary to eliminate the algae located near the upper layer of the water, the apparatus 1 is operated so that it draws in the deep water 18 through its lower end and delivers this water near the surface 5 as an upward vertical jet stream of water. Once this upward jet stream reaches said near surface waters, it generates uninterrupted horizontal outward currents, in all radial directions (see FIG. 6), that dissolves and carries away, from the open fish breeding cages 3 the upper mass of contaminated water 19. The depth of the suction or draft lower end is adjustable so that the lower end can be moved below the algae so that it does not trap algae-contaminated water. The depth of the upper end of the tube 2 is also adjustable such that the current is capable of removing all the contaminated water, which may have a varying thickness within a predetermined period of time.

Figure 3:
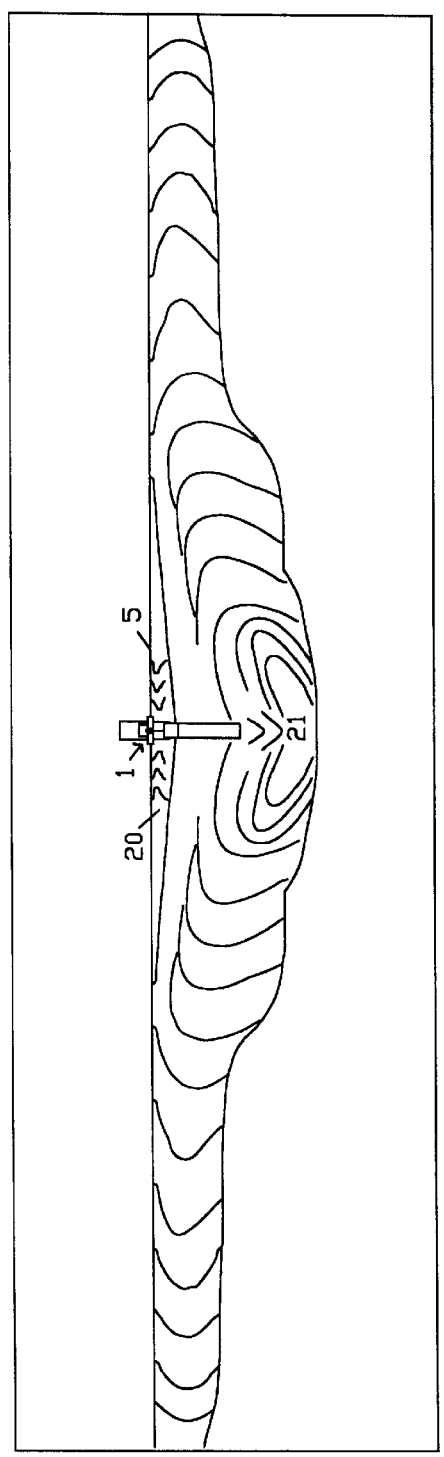
FIG. 3 illustrates the water current generated when the apparatus is drawing a downward major flow, in order to solve the "lack of dissolved oxygen concentration" problem.
Figure 5:
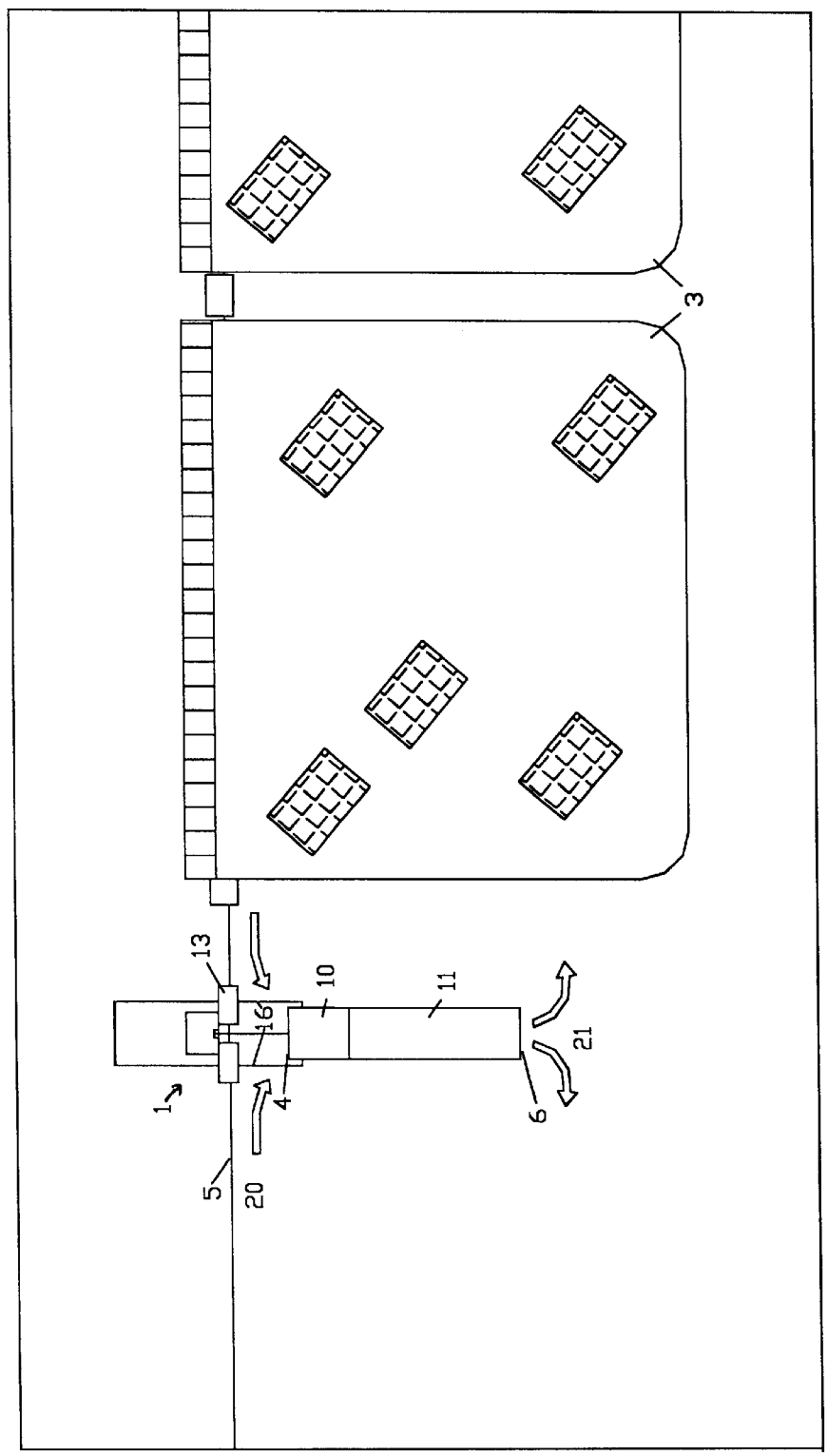
FIG. 5 illustrates the location of the apparatus with respect to a set of open fish breeding cages when the apparatus is drawing a downward major flow, in order to solve the "lack of dissolved oxygen concentration" problem.

Referring now to FIGS. 1, 3, and 5, the apparatus 1 according to the invention also replenishes the oxygen at a determined depth of the breeding cages 3. To this effect, the rotation of the impeller 8 is reversed such that the water circulation apparatus 1 drafts water from the highest point, where the most oxygen-rich water 20 is found, and discharges the oxygen-rich water at the depth where the biggest oxygen-consuming fish concentration is located, in which is observed a water zone 21 with lack of dissolved oxygen concentration.

It is also worth noting that the algae negatively affects the fish's breathing system because the algae particles adhere to the gills of the fish. Consequently, elimination of the algae substantially benefits the metabolism of the fish.

In conclusion, the apparatus 1 and method of the present invention raises water from a water zone 18 comprising low concentration of algae and other harmful agents for fish life to a water zone 19 comprising dangerous concentration levels of "bloom of harmful seaweed" or other harmful agents for fish life, in order to remove the presence of algae within the upper portion of the cage. The invention also injects water from a water zone 20, defined for the surface water, which normally has a high dissolved oxygen concentration, to a water zone 21, where the biggest oxygen consumers fish concentration is located, in which the lack of dissolved oxygen concentration is observed, when the impeller 8 is operated in a reverse direction in order to increase the oxygen content of the oxygen deficient deeper water.

We claim:

1. An apparatus for conditioning water in open fish breeding cages, the apparatus comprising:
    a tube immersed in water,
    a lower mouth located on its lower end and an upper mouth located on its upper end;
    means for adjusting the depth of said lower mouth;
    an impeller with its driver motor, coupled inside of the tube, able to draw major flows in both directions;
    an upper mouth configuration which directs said major flow vertically or in other directions able to create an upward major flow, when the impeller is drawing water upwardly, that dissolves and carries away, from the open fish breeding cages, an upper mass of contaminated water, because of uninterrupted outward currents, generated for said major upward flow, in all radial directions, once it reaches said upper mass of contaminated water; and
    wide range depth adjusting means for said upper mouth, which permits varying the thickness of the carried upper mass of contaminated water, when the impeller is drawing water upwardly, and drawing water from the surface, when the impeller is drawing water downwardly.

2. An apparatus as claimed in claim 1, wherein said apparatus further comprises a floating platform that supports the tube, the impeller and said wide range depth adjusting means; said platform comprises a power source for driving said motor of said impeller.

3. An apparatus as claimed in claim 2, wherein said motor is a hydraulic motor and said power source comprises a pump that supplies compressed oil to said hydraulic motor.

4. An apparatus as claimed in claim 3, wherein said wide range depth adjusting means, supported by said floating platform, includes a pair of bushings mounted to the floating platform and two bars inserted within the bushings and slidingly coupled to the floating platform, wherein the tube is coupled to the bars in such away that when the bars slide inside the bushings the depth of the tube may be varied.

5. An apparatus as in any of the preceding claims, wherein the tube comprises a first section which contains inside the impeller with its driver motor and a second section, connected to the lower part of said first section, which comprises an adjustable length metallic mesh tube capable of being covered on the outside by a plastic sleeve, which defines the depth of the suction or discharge point of the apparatus.

* * * * *

UNITED STATES PATENT AND TRADEMARK OFFICE
CERTIFICATE OF CORRECTION

PATENT NO. : 6,659,044 B2
DATED : December 9, 2003
INVENTOR(S) : Daniel Eduardo Vega Salinas It is certified that error appears in the above-identified patent and that said Letters Patent is hereby corrected as shown below:

Column 2,
Line 13, "weather" should be -- water --
Line 21, "carrys" should be -- carries --

Column 4,
Line 66, "away" should be -- a way --

Signed and Sealed this

Tenth Day of February, 2004

JON W. DUDAS
*Acting Director of the United States Patent and Trademark Office*